(12) United States Patent
Dent

(10) Patent No.: US 6,507,602 B1
(45) Date of Patent: Jan. 14, 2003

(54) SMOOTHING RECEIVER CHANNEL ESTIMATES USING SPECTRAL ESTIMATION

(75) Inventor: Paul W. Dent, Pittsboro, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/227,180

(22) Filed: Jan. 7, 1999

(51) Int. Cl.[7] .............................................. H04L 27/30
(52) U.S. Cl. ..................... 375/142; 375/150; 375/232; 375/267; 375/343; 375/347; 375/349; 375/350; 370/290; 370/320; 370/335; 370/437; 370/468; 455/52.3; 455/65; 455/67.3; 455/134; 455/226.2; 455/231; 455/303; 708/222
(58) Field of Search ................................ 375/142, 150, 375/232, 267, 343, 346, 347, 349, 350, 147, 141, 140, 130, 264, 260, 230, 229; 370/280, 281, 290, 330, 319–321, 335, 342, 437, 441, 465, 468, 479; 455/52.1, 52.3, 65, 67.1, 67.3, 67.6, 134, 225, 226.2, 231, 303, 306; 708/300, 322

(56) References Cited

U.S. PATENT DOCUMENTS

| 5,151,919 | A | | 9/1992 | Dent | |
|---|---|---|---|---|---|
| 5,218,619 | A | | 6/1993 | Dent | |
| 5,305,349 | A | | 4/1994 | Dent | |
| 5,331,666 | A | | 7/1994 | Dent | |
| 5,335,250 | A | | 8/1994 | Dent et al. | |
| 5,557,645 | A | | 9/1996 | Dent | 375/340 |
| 5,572,552 | A | | 11/1996 | Dent et al. | 375/343 |
| 5,619,533 | A | | 4/1997 | Dent | 375/232 |
| 6,026,115 | A | * | 2/2000 | Higashi et al. | 370/335 |
| 6,034,986 | A | * | 3/2000 | Yellin | 375/148 |
| 6,067,324 | A | * | 5/2000 | Harrison | 375/219 |
| 6,208,632 | B1 | * | 3/2001 | Kowalski et al. | 370/335 |
| 6,333,934 | B1 | * | 12/2001 | Miura | 370/335 |

FOREIGN PATENT DOCUMENTS

| DE | 4329317 | 3/1995 |
|---|---|---|
| EP | 0825727 | 2/1998 |
| WO | 9613910 | 5/1996 |

OTHER PUBLICATIONS

Article entitled "Computer Simulation of Radio Channels Using a Harmonic Decomposition Technique" published in IEEE Transactions on Vehicular Technology, vol. 44, No. 3, published Aug. 1, 1995.

* cited by examiner

Primary Examiner—Stephen Chin
Assistant Examiner—Dac V. Ha
(74) Attorney, Agent, or Firm—Moore & Van Allen, PLLC; Steve B. Phillips

(57) ABSTRACT

A receiving apparatus comprises a receiver receiving signals via multiple propagation paths having different propagation delays and converting the signals to digital samples for processing. A channel estimator is operatively coupled to the receiver for correlating periodically selected groups of the digital samples corresponding to known symbols and periodically producing numerical estimates related to amplitudes and phases of the delayed propagation paths. A filter system filters the numerical estimates using filters periodically adapted to center frequencies of variations of the numerical estimates. A data decoder is operatively coupled to the receiver and the filter system for decoding data using the filtered estimates and the digital data.

47 Claims, 5 Drawing Sheets

SMOOTHING RECEIVER CHANNEL ESTIMATES USING SPECTRAL ESTIMATION

FIELD OF THE INVENTION

This invention relates to receivers for decoding signals received via multiple propagation paths having different propagation delays and, more particularly, to use of filters periodically adapted to center frequencies of variations of numerical estimates of amplitude and phases of the delayed propagation paths.

BACKGROUND OF THE INVENTION

Radio receivers are often used for decoding fading signals with the aid of estimates of the instantaneous propagation channel phase and amplitude characteristics. An exemplary application for such a radio receiver is a cellular phone for decoding signals transmitted by base stations using code division multiple access (CDMA) protocols.

A radio receiver, such as for a CDMA system, receives digitally coded and modulated signals from a transmitter. These signals include known, preselect signal patterns at known time intervals. Using known signal patterns and, optionally, data signals obtained after data decoding, the receiver forms successive estimates of the phase and amplitude or complex value of propagation path characteristics between the transmitter and the receiver. These include estimates for multiple paths in the case of multi-path propagation.

It is desirable to smooth the sequence of successive channel estimates to reduce noise and estimation error. A smoothing filter that has a symmetrical filter response is appropriate when the fading spectrum is symmetrical about zero frequency, as expected with a long term average. However, in the short term, on the order of seconds, the fading spectrum may be asymmetrical due to non-uniform distribution of the angle of arrival of multi-path arrays.

The use of channel estimation from a received radio signal using both known symbols embedded in the signal, as well as unknown information symbols that are decoded by the receiver, are well known in the art. Examples of such receivers are shown in U.S. Pat. Nos. 5,331,666; 5,335,250; 5,557,645; and 5,619,533, and also U.S. patent application Ser. No. 08/305,727, filed Sep. 14, 1994, all of which are incorporated by reference herein. Exemplary receivers using channel estimation specific to CDMA systems are shown in U.S. Pat. Nos. 5,151,919 and 5,218,619, also incorporate by reference herein.

Smoothing of channel estimates may be accomplished using a Finite Impulse Response (FIR) filter having a series of complex coefficients. Discussion on smoothing channel estimates using FIR filter, or autoregression, may be found in "Adaptive Equalization For Mobile Radio Channels" (Licentiate Thesis, Lars Lindblom, Uppsala University 1992, ISSN 03468887), which is also incorporated by reference herein. This paper discusses the benefit of adapting a smoothing filter's characteristics to the fading spectrum of the signal. However, in the prior art the fading spectrum of a signal was assumed to be symmetrical. Over the long term, for example several minutes, the fading spectrum may be symmetrical in accordance with Jake's model for fading in the urban, mobile radio propagation environment. The use of Jake's model and modifications thereof to speed computation during simulations of communications system performance may be found in a paper entitled "Jake's Fading Model Revisited" by Dent et al., *ELECTRONICSLETTERS*, Jun. 24, 1993, Volume 29, No. 13, page 1162 et seq., which paper is incorporated by reference herein.

Jake's model assumes a uniform angular distribution of reflecting objects around a mobile receiver. The relative Doppler shift of reflected signals arising from different angles relative to the direction of movement varies with the cosine of the angle of arrival. With a uniform angular distribution, the Doppler spectrum is then symmetrical and two sided, having as much reflected energy arriving from behind the mobile receiver with a negative Doppler frequency shift as from ahead of the receiver, having a positive Doppler frequency shift. Rays reaching the receiver from behind have clearly not propagated an equal distance from transmitter to receiver as rays reaching the receiver from the front. However, these delay differences were ignored in the prior art. Jake's model assumed that rays with such delay differences could nevertheless be combined to produce a net fading waveform for a path of delay equal to the mean of these rays. More specifically, delays lying within a plus or minus 0.5 of a modulation symbol period of each other were combined to produce a net fading ray with a mean delay. Delays outside that plus or minus 0.5 modulation symbol period were grouped into a different plus or minus 0.5 symbol window to obtain a different net fading waveform with a different mean delay. The different net fading waveforms with their associated modulation-symbol-space delays were then taken to characterize a multi-path channel. Each of the multiple paths is nevertheless assumed to conform to Jake's fading model, i.e., each path is the combination of rays arriving uniformly from all directions.

In a wide band CDMA system (WBCDMA), modulation symbol intervals are much shorter. This allows multiple propagation paths to be resolved with much finer time resolution. Thus, it is no longer valid to use a Jake's model which adds rays that differ in their propagation delay by even a fraction of a microsecond. This addition was valid only in the context of narrow band FDMA or medium bandwidth TDMA systems. In WBCDMA systems, it is necessary to restrict combination of different rays reaching the receiver to rays that have the same propagation delay from the base station to the mobile station, within plus or minus 0.5 of a CDMA chip duration. In a five MHZ wide WBCDMA system, a chip duration is typically 0.25 microseconds so that plus or minus 0.5 chips is plus or minus 0.125 microseconds, or plus or minus 37.5 meters expressed as a propagation path length variation. It may be shown that rays with the same delay to this order of accuracy must have reflected from objects lying on an elliptical contour having the base station and the mobile station as its foci. These objects are not any longer uniformly angularly spaced around the mobile receiver, nor are they spaced at the same distance from either the mobile station or the base station. Moreover, since the base station lies inside the elliptical contour, if, as is usual, it employs directional transmit antennae, objects around the elliptical contour will not be uniformly illuminated. Consequently, the fading spectrum of a ray of given delay within plus or minus 0.5 chip periods are no longer symmetrical about zero frequency. In addition, the offset from zero frequency of the centroid of the fading spectrum is no longer independent of the direction of motion. Consequently, the assumptions of the prior art used in channel estimation and smoothing of channel estimates are overly pessimistic as regards to the bandwidth of the fading.

A claim made in the published art for WBCDMA signals is that the high time resolution enables resolution of individual reflecting objects such that each resolved ray is a single, non-fading ray, i.e., WBCDMA "eliminates fading". It is recognized that such "non-fading" rays will come and go, but on the relatively longer time scale of log normal shadowing, which is easier to track. However, each ray has a varying Doppler frequency, which means that its phase still varies at up to the Doppler rate, even if its amplitude varies much slower. Thus, there remains the need to track the varying complex value of the propagation channel in order to effect coherent signal decoding, i.e., with knowledge of a phase reference. Moreover, the complete elimination of fading by resolving small reflecting objects is not achieved except using very large bandwidths, beyond the bandwidths of anticipated WBCDMA systems, which therefore find themselves in the intermediate region of propagation paths that still each comprise multiple rays. Fading models and channel estimation means for these WBCDMA have not been addressed in the prior art.

The present invention is directed to solving one or more of the problems discussed above in a novel and simple manner.

SUMMARY OF THE INVENTION

In accordance with the invention a receiver uses a smoothing filter having an asymmetrical frequency response and adapted to the short term spectral shape of each of resolvable multi-path fading waveforms.

Broadly, there is disclosed herein a receiver for decoding signals received via multiple propagation paths having different propagation delays. The receiver includes receive means for receiving the signals and converting the signals to digital samples for processing. First processing means are operatively associated with the receive means for correlating periodically selected groups of the digital samples for responding to known symbols and periodically producing numerical estimates related to amplitudes and phases of the delayed propagation paths. Filter means filter the numerical estimates using filters periodically adapted to center frequencies of variations of the numerical estimates. Second processing means are operatively associated with the receive means and the filter means for decoding data using the filtered estimates and the digital data.

It is a feature of the invention that the receive means is adapted to receive code division multiple access (CDMA) signals.

It is another feature of the invention that the first processing means comprises a matched filter matched to the known symbols.

It is another feature of the invention that the known symbols comprise pilot symbols spread with a known CDMA spreading code. The pilot symbols recur in the signals every 0.625 milliseconds.

It is another feature of the invention that the filter means comprises a Finite Impulse Response (FIR) filter. The FIR filter processes a stream of real estimate values and a stream of corresponding imaginary estimate values jointly using a set of complex coefficients. The FIR filter comprises a minimum phase filter.

It is a further feature of the invention that the filter means comprises a running average filter. The running average filter is compensated for frequency offsets in filtered values.

It is still another feature of the invention that the filter means has an asymmetrical frequency response.

It is yet another feature of the invention that the second processing means comprises a rake receiver.

It is an additional feature of the invention to provide third processing means operatively associated with the first processing means for estimating the center frequencies using the periodically produced numerical estimates and updating the filter means with the estimated center frequencies. The third processing means computes a complex autocorrelation. Particularly, the third processing means computes a complex Fourier transform.

There is disclosed in accordance with another aspect of the invention a receiving apparatus comprising a receiver receiving signals via multiple propagation paths having different propagation delays and converting the signals to digital samples for processing. A channel estimator is operatively coupled to the receiver for correlating periodically selected groups of the digital samples corresponding to known symbols and periodically producing numerical estimates related to amplitudes and phases of the delayed propagation paths. A filter system filters the numerical estimates using filters periodically adapted to center frequencies of variations of the numerical estimates. A data decoder is operatively coupled to the receiver and the filter system for decoding data using the filtered estimates and the digital data.

There is disclosed in accordance with a further aspect of the invention the method of decoding signals received via multiple propagation paths having different propagation delays, comprising the steps of receiving the signals and converting the signals to digital samples for processing, periodically correlating selected groups of the digital samples corresponding to known symbols and periodically producing numerical estimates related to amplitudes and phases of the delayed propagation paths, filtering the numerical estimates using filters periodically adapted to center frequencies of variations of the numerical estimates, and decoding data using the filtered estimates and the digital data.

More particularly, in one embodiment of the invention, the centroid of the fading spectrum is determined by processing successive channel estimates using any spectral estimation technique, such as Fourier transform. The frequency offset from zero frequency of the spectral centroid is then utilized to center the frequency response of a smoothing filter. The smoothing filter can then have a narrower bandwidth and suppress more noise then a prior art non-centered filter. Centering the filter includes applying a successive phase twist to the successive channel estimates to center the fading spectrum for filtering with a symmetrical filter. Alternatively, an FIR filter can have a series of complex coefficients which embody the successive phase twist to produce a frequency offset response.

In a preferred embodiment, the smoothing filter frequency response is matched to the asymmetrical fading spectrum of each path individually. Successive estimates for a propagation path are processed to determine a fading spectrum using, for example, a Fast Fourier Transform (FFT). The modulus of the spectral components is formed as an estimate of the square root of the power spectrum. The modulus spectrum, including asymmetries about zero frequency caused by frequency error and asymmetrical distribution of Doppler components, is used to determine a filter for smoothing the estimates of that propagation path's characteristics in a future time period to reduce noise on the estimates. For example, the inverse FFT of the modulus spectrum can be used to determine complex coefficients of a complex FIR filter to be applied in the time domain. The complex coefficients exhibit systematic phase twists in correspondence to the modulus spectrum asymmetry. Propagation path estimates filtered using a matched filter structure having the calculated FIR coefficients are then used to improve data decoding using, for example, a rake receiver in the case of CDMA signals in which the filtered path estimates are used as tap weights. The FIR coefficients may be updated only at the rate at which the short term fading spectrum is expected to change. For example, sixteen channel estimates may be computed every ten milliseconds and processed by a sixteen-point FFT to obtain a new power spectrum. The new power spectrum may be combined with a previously averaged power spectrum to obtain a new average power spectrum using, for example, "exponential forgetting" in which earlier power spectra are given a lower weight in the average than more recent spectra.

Spectral components greater than a maximum expected Doppler frequency may be discarded. Alternatively, a noise floor may be estimated and components at or below the noise floor may be discarded. With another alternative, the location of most spectral energy can first be determined, and then an expanding box placed about that frequency centroid which is allowed to increased in width until it is deemed to encompass all spectral components of significance. After processing by any of the above techniques to delete insignificant spectral components, the square root of the remaining components are then computed and inverse Fourier transformed to determine a set of complex FIR coefficients for use as a smoothing filter for a path. In this way, each path's fading channel estimates become filtered with a filter adapted to their particular fading characteristics, thus improving noise suppression.

Further features and advantages of the invention will be readily apparent from the specification and from the drawings.

DETAILED DESCRIPTION OF THE INVENTION

Figure 1:
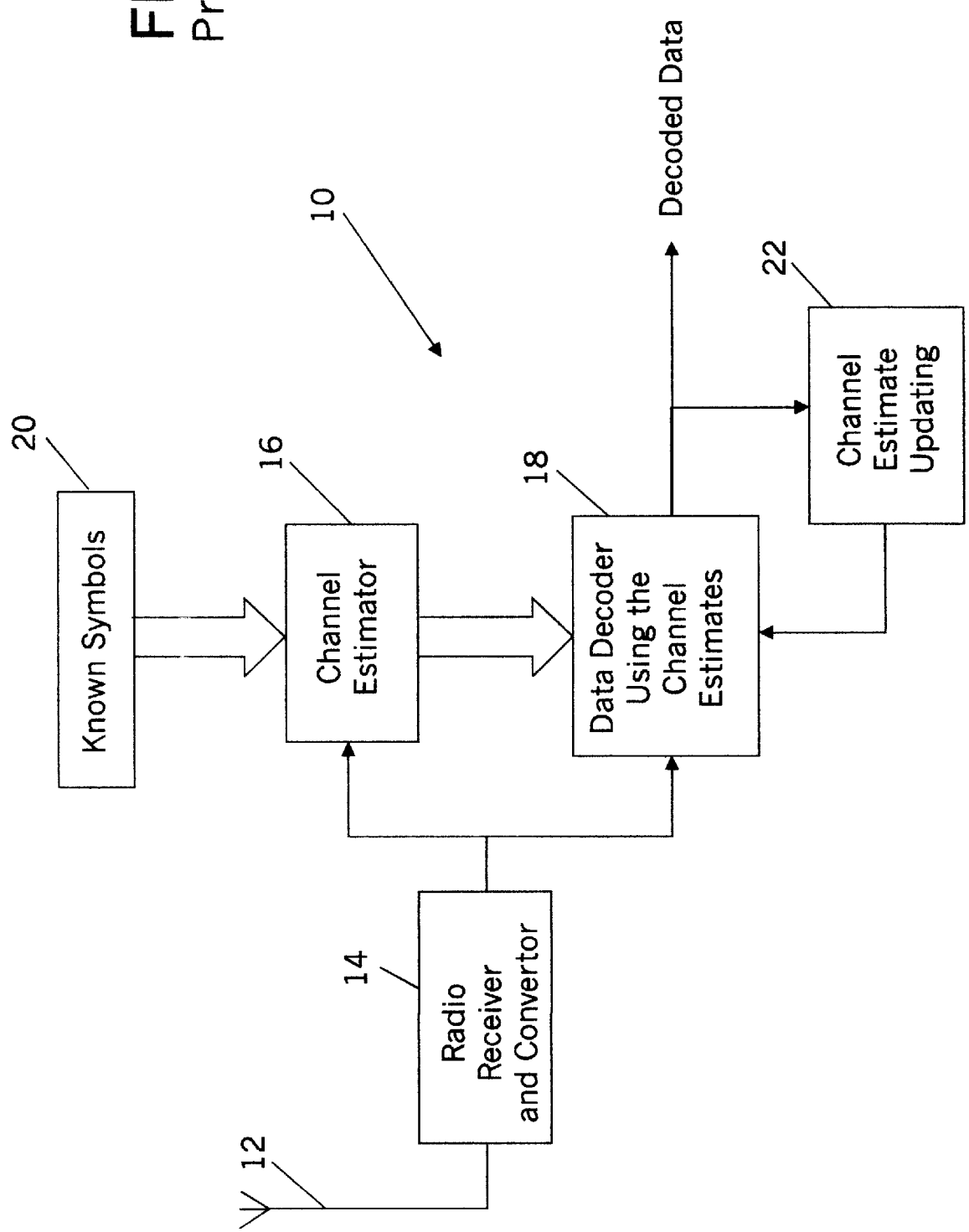
FIG. 1 is a block diagram of a prior art receiver for decoding CDMA signals using channel estimates.

Referring to FIG. 1, prior art CDMA receiver 10 is illustrated. The receiver 10 includes an antenna 12 for receiving radio signals. The signals are received via multiple propagation paths having different propagation delays. The antenna 12 is coupled to a radio receiver and converter 14. The radio receiver and converter 14 filters and amplifies signals and converts them to a suitable form for processing, such as complex numerical sample values. The signals are in the nature of digital samples for processing. The radio receiver and converter 14 is coupled to a channel estimator 16 and a data decoder 18. The channel estimator also receives known symbols from a block 20. The known symbols comprise pilot or reference symbols also included in the received signal used for determining channel estimates. The known symbols are stored in a memory or generated locally in a code generator. The channel estimator 16 correlates the received digital samples with the known symbols to provide channel estimates to the data decoder 18. The data decoder 18 processes the signal samples together with the channel estimates to weight different rays and to extract information. The data decoder 18 may be, for example, a rake receiver. Examples of a rake receiver are illustrated in U.S. Pat. Nos. 5,305,349 and 5,572,552, which are incorporated by reference herein.

In the United States CDMA cellular system known as IS95, a transmitter transmits a stream of known symbols known as the pilot code. The pilot code is transmitted on the same channel at the same time as other, information bearing, symbols using different spreading codes. The channel estimator 16 correlates the received signal, comprising the pilot code and other codes in additive superposition, with the known pilot code and low pass filters the resultant complex correlation to obtain channel estimates. In principal, the channel estimates are continuously known. Due to multi-path propagation, the received signal is correlated with different delays between the pilot code and the received signal to obtain channel estimates for each of the multiple paths. The received signal is also correlated with other codes carrying information it is desired to decode. The results of correlating with information carrying codes are multiplied by the conjugate of pilot code correlations for the same delay, and the results added to coherently combine the multi-path signals. This provides an optimum combination only when interference from other transmitters dominates. U.S. Pat. No. 5,572,252, incorporated by reference herein, provides details of how to derive optimum weighting factors when interference from the same transmitter dominates.

When a receiver and transmitter are in relative motion, the channel estimates continuously change at a rate related to the relative velocity. This limits the amount of low-pass filtering that can be applied to the channel estimates, and therefore limits the amount of noise reduction obtainable by filtering them with a filter adapted to the highest speed. Ideally, an estimate of the speed is made in the lowest bandwidth filter used which passes all varying components of the channel estimates up to some maximum rate of variation related to speed.

In the prior art, the model of the motion-dependent changes in propagation path known as Jake's model was used. Jake's model assumes multiple rays received at the receiver arise by reflection from objects that are uniformly spaced around the receiver. In this case, the frequencies of signal variation are distributed from minus the maximum Doppler frequency to plus the maximum Doppler frequency. The distribution of energy at different variation frequencies is symmetrical and independent of the direction of motion.

In wide band CDMA (WBCDMA) systems, the receiver is capable of resolving rays of different propagation delay with finer time resolution. Thus, rays of a particular delay do not arise from reflecting objects disposed around a circle centered on the receiver. Rather, the rays reflect from objects disposed on an ellipse with the transmitter and receiver as foci, as illustrated in "A Geometrically Based Model for Line-of-Sight Multipath Radio Channels" (Liberti and Rappaport, VTC 96, Apr28–May 1, 1996, Atlanta) (IEEE Publication No. 0-7803-3157-5/96). If the transmitter does not illuminate the whole ellipse uniformly due to the use of directional antennae, there will not necessarily be as many reflections corresponding to the objects lying between the receiver and the transmitter as from objects lying further away from the transmitter than the receiver. This can result in an asymmetric distribution of fading spectral energy, with more energy at positive Doppler shifts if the receiver is moving away from the transmitter, or more energy at negative Doppler shifts if the receiver is moving towards the transmitter. The width of the fading spectrum is therefore reduced compared to the symmetrical, two-sided spectrum that has its center offset. In accordance with the invention, the filtering of channel estimates is adapted to improve noise reduction by using a filter compensated for the frequency offset and reduced bandwidth. The fading spectrum is expected to change for rays of different propagation delay. Therefore, a differently adapted filter is employed for different multi-path components, as described below.

Another type of CDMA system does not transmit a continuous pilot code overlapping information bearing codes. Instead, information bearing codes are used to spread-spectrum code a number of information bearing symbols that are unknown to the receiver prior to decoding, interspersed in time with a number of pilot symbols already known to the receiver. A receiver for this type of CDMA system still conforms to that illustrated in FIG. 1. However, the channel estimation is carried out using the pilot symbols instead of the pilot code of IS95. The resulting channel estimates are provided at periodic intervals whenever the pilot symbols are transmitted, and must be estimated in-between by interpolation or extrapolation. Both of these are a form of low-pass filtering. The channel estimates provided by the channel estimator 16 can also be thought of as initial estimates made using pilot symbols prior to the reception of information bearing symbols. The channel estimates are then updated as information symbols lying further and further from the pilot symbols are decoded. Channel estimate updating can be assisted by using correlations made on the information bearing symbols after they are decoded using a channel estimate updater 22 which provides feedback to the data decoder 18. Use of such data-assisted channel tracking is optional, but can improve decoding performance. This is particularly true when the technique of an application entitled "Maximum Likelihood Rake Decoder for CDMA Signals", (Docket EUS02162-RMOT), the specification of which is incorporated by reference herein, is employed.

Figure 2:
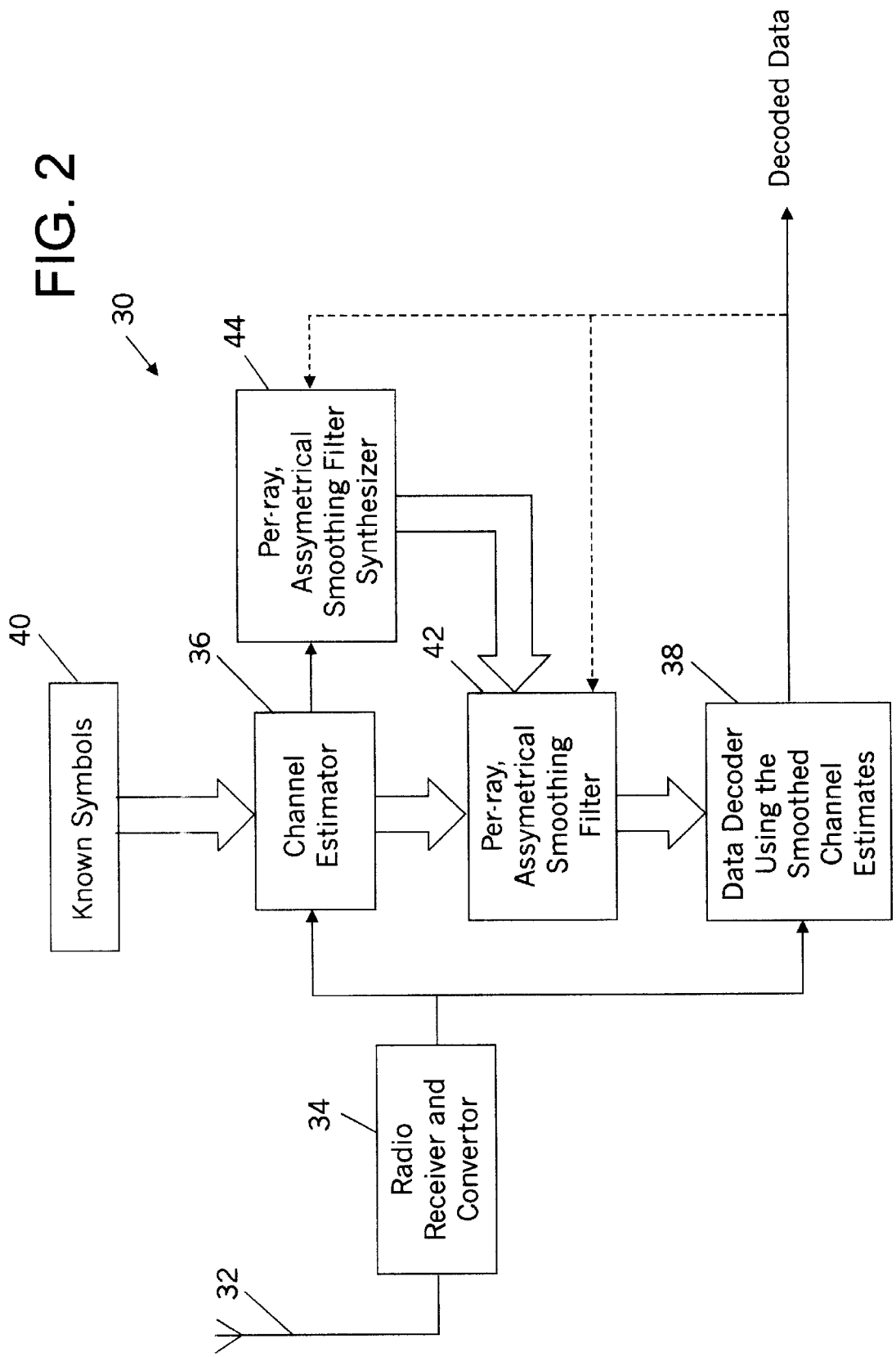
FIG. 2 is a block diagram of a receiving apparatus according to the invention for decoding CDMA signals using adaptable smoothed channel estimates.

Referring to FIG. 2, a block diagram of a receiving apparatus 30 according to the invention is illustrated. The receiving apparatus 30 includes an antenna 32 connected to a radio receiver and converter 34. The radio receiver and converter 34 is generally similar to the radio receiver and converter 14 of FIG. 1. Particularly, the radio receiver and converter 34 receive signals via multiple propagation paths having different propagation delays and converts the signals to digital to samples for processing by a channel estimator 36 and a data decoder 38. The channel estimator 36 receives known symbols from a block 40. The known symbols may be stored in a memory or generated locally in a local code generator. The channel estimator 36 forms channel estimates, as discussed above relative to the block 16 of FIG. 1, and processes them optionally with correlations made on decoded data samples using an asymmetrical smoothing filter 42 according to the invention. A different asymmetrical smoothing filter can be applied to each channel estimate corresponding to different multi-path rays. The filter parameters for each smoothing filter 42 are provided by a smoothing filter synthesizer 44 which is connected to the data decoder 38 and the channel estimator 36. The data decoder 38 decodes data using the filtered estimates and the digital data samples. The data decoder 38 may be generally similar to the data decoder 18 of FIG. 1.

The smoothing filter synthesizer 44 processes the channel estimates from the channel estimator 36 and optionally correlations made on decoded data symbols collected over a longer term from the data decoder 38 to determine the fading spectrum characteristics of each fading ray. These long-term spectral characteristics are only expected to change at a rate at which the receiver changes its direction or velocity of motion. This would not happen in periods of one second, for example. One second is, however, a long time period in the context of forming instantaneous channel estimates. In accordance with the invention, the synthesizer 44 analyzes long-term statistics of fading rays and utilizes these characteristics to optimize the smoothing filter 42 for making improved short-term estimates of the varying ray phases and amplitudes.

Figure 3:
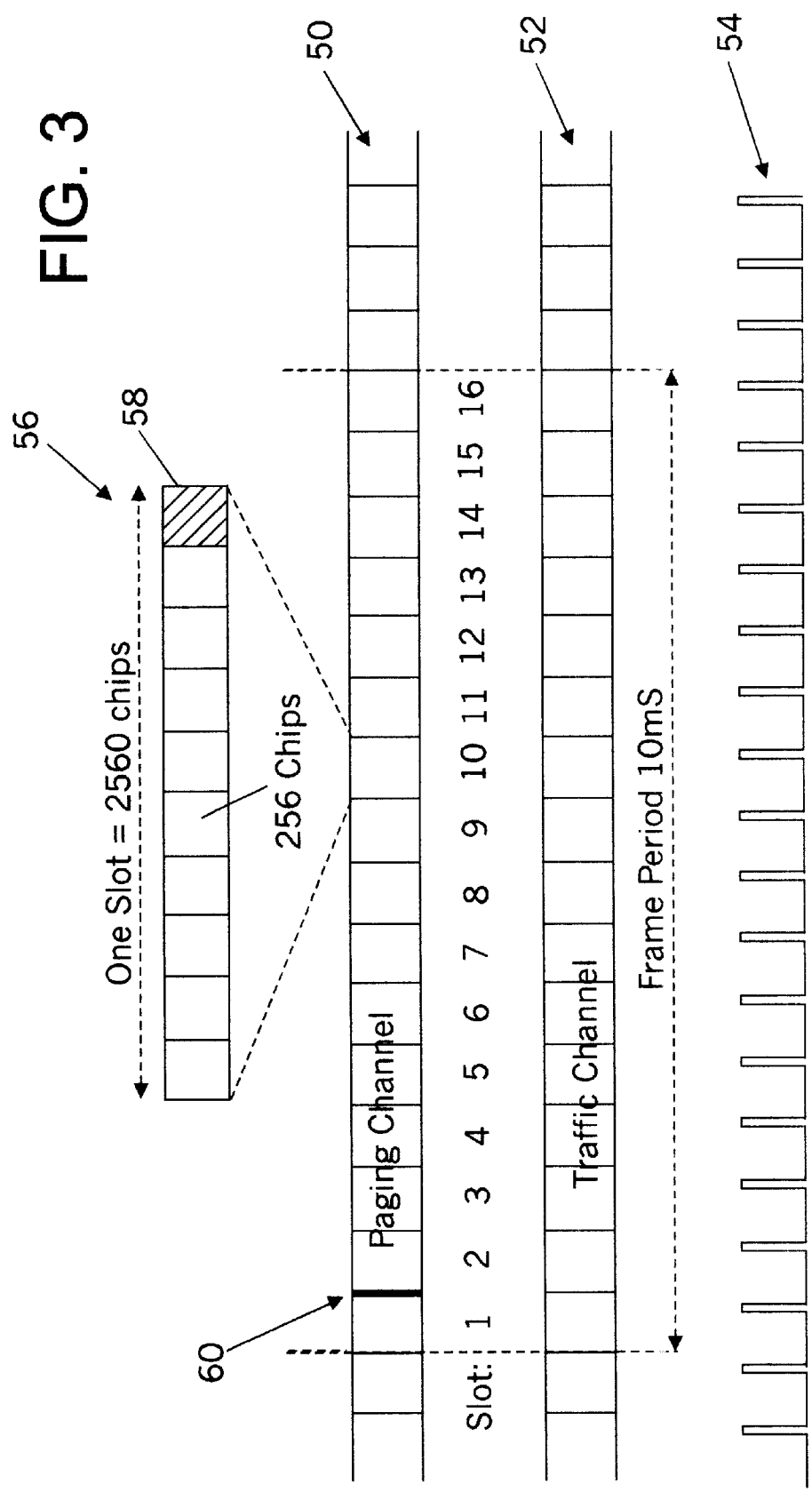
FIG. 3 is a waveform of a typical WBCDMA transmission with which the receiver of FIG. 2 may be utilized.

Referring to FIG. 3, the signal format for a WBCDMA signal suitable for use with the receiving apparatus 30 of FIG. 2 is illustrated. This is a signal format adopted for use in Japanese and European cellular systems and provides for clarity of transmission.

With the illustrated WBCDMA signal format, information is transmitted on a paging channel 50, a traffic channel 52, and a periodic channel 54. This format uses a ten millisecond repetitive frame period, as shown. Each frame includes sixteen time slots. Each slot includes 2560 chips. Each slot is, in turn, segregated into ten 256 chip symbols as illustrated at 56.

The periodic channel 54 is used for an intermittent transmission referred to as "periodic channel 1" (PERCH 1). This is a burst of a 256 chip known code in every 0.625 millisecond time slot. The receiver will look for the PERCH 1 transmission first, as it must recognize a known code in each 2560 chip slot. This is used for synchronizing the timing. Additionally, one 256 chip symbol in every paging channel slot is a PERCH 2 code, as illustrated at 58. The PERCH 2 code is one of sixteen pre-selected known codes. As illustrated, the PERCH 2 code is timed to coincide with the PERCH 1 burst. Thus, after synchronizing timing with finding the PERCH 1 code, the receiver looks for the PERCH 2 code. This two-step process simplifies and reduces the time required for finding the PERCH 2 code. The PERCH 2 code is decoded to determine the spreading code used in the transmission. As is well known, the spreading code is combined with the transmitted symbols prior to transmission. Once the spreading code is known, it can be used with the known symbols to know what data to look for in the channel estimator 36 without any ambiguity.

As an alternative, the PERCH 2 code may be provided as a CW burst in one slot per frame as illustrated at 60.

To determine the fading spectrum of each ray, channel estimates for each ray are made for each of the sixteen time slots in the repetitive frame period shown in FIG. 3. This is done by correlating the complex received digital signal samples with known symbols included in each slot. The resulting sixteen complex numbers for ray (k), $FR(i,k)+jFI(i,k)$ (i=1 to 16) are then processed using a known, sixteen point FFT algorithm to obtain sixteen complex spectral values $CR(i,k)+jCI(i,k)$ for (i=1 to 16). The modulus squared of the spectral values is then calculated from $CR^2(i,k)+CI^2(i,k)$ and averaged with a set of sixteen average power spectrum values $P(i,k)$ for each ray (k) to update the average power spectrum for each ray (k). An averaging time constant of 100 milliseconds can be used, for example, by adding to each old $P(i,k)$ value $\frac{1}{10}$th of the difference between the new squared modulus value and the old $P(i,k)$ value.

Figure 5:
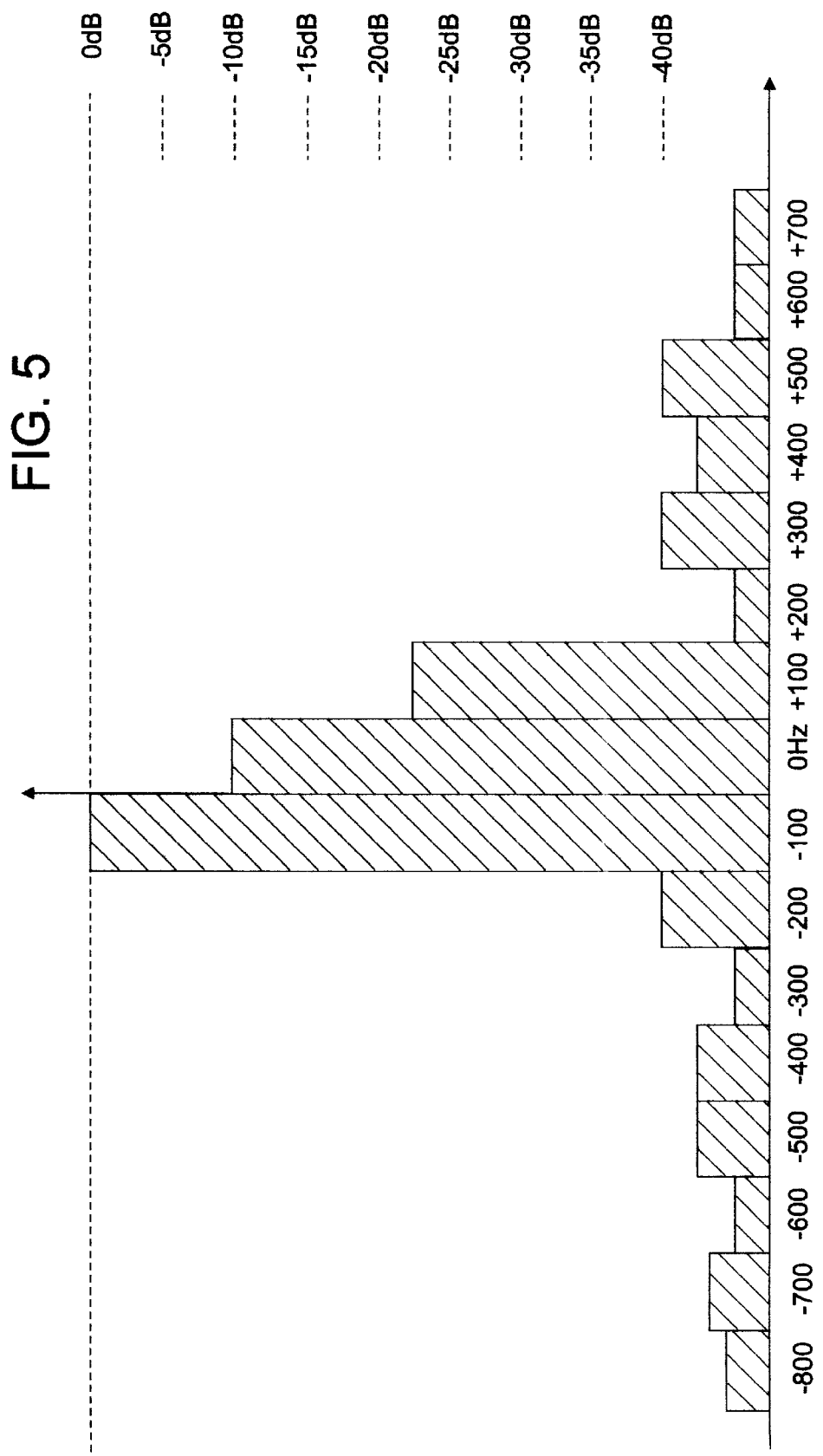
FIG. 5 illustrates a possible power spectral plot for a fading ray.

The updated power spectrum for each ray can be used to determine a smoothing filter for the channel estimates for each ray. To aid in visualizing the different ways of determining a smoothing filter using the average spectral properties, an exemplary spectral plot is shown in FIG. 5. When sixteen time samples spaced by 0.625 milliseconds, corresponding to the time slots shown in FIG. 3, are processed by an FFT to form a spectrum, the total spectral width is the reciprocal of 0.625 milliseconds, or 1.6 KHz. This corresponds to −800 Hz to +800 Hz. In the power spectrum of FIG. 5, the central, low frequency components dominate, as would be expected for a mobile receiver moving at a reasonably low speed. However, the power spectrum is asymmetrical, showing most energy at −100 Hz and less at 0 Hz and +100 Hz. There is also noise energy at all frequencies, even those that represent impossibly high speeds. Consequently, all terms with Doppler shifts corresponding to unreasonable speeds may first of all be set to zero. For example, if the receiver is being carried in a passenger car expected to travel less than 70 miles per hour, and the receiver operating frequency is 2 GHz, there should be no Doppler components of 200 Hz or more. Thus, the only surviving components are the −100 Hz, 0 Hz, and +100 Hz components. An alternative pruning algorithm moves a limit outwards from the spectral peak, the −100 Hz term in FIG. 5, until no components less than 20 dB below the peak exist outside the limit. This would eliminate the term at +100 Hz, which is 22.5 dB below the peak and all of the higher frequency noise terms. Applying both strategies, only the −100 Hz and 0 Hz terms remain. Thus, an asymmetrical smoothing filter should be used which passes only these spectral components.

One method to produce such a smoothing filter is to convert the pruned power spectrum back to an amplitude spectrum by taking the square root of the surviving terms. The resulting amplitude spectrum is then processed by an inverse FFT to obtain sixteen weighting values which are used to weight sixteen successive channel estimates for the same ray to produce an FIR filtered channel estimate. This channel estimate is used for decoding data in the middle slot of the sixteen slots giving the sixteen channel estimates. Such a filter is time-symmetric, but frequency-asymmetric. Taking the square root of each term of a power spectrum is one way of performing what is known as spectral factorization. This particular method gives real amplitude spectral values and therefore a time-symmetrical impulse response. This, in turn, means that eight future slots must be received and used together with eight past slots to decode a current slot. However, there are other valid spectral factorizations corresponding to the arbitrary phase that can be applied to every spectral line of the amplitude spectrum. One choice of these phases is called the minimum phase factorization. If the power spectrum is represented by a polynomial in frequency squared ($w^2$) that passes through the spectral values, then the roots of the polynomial (in $w^2$) can be found and then the roots at frequency w are±the square roots of these; selecting only those roots with a negative real part to construct a square root polynomial gives the minimum phase spectral factorization. The inverse FFT of this then gives the coefficients of an FIR filter that uses as little "future history" and as much past history as possible. Other simpler procedures are possible, such as just using a rectangular filter frequency response that encompasses all terms surviving pruning. The minimum-phase factorization of this also would be preferable.

A further alternative is to determine the centroid of the spectral energy, −100 Hz in the example of FIG. 5, and then to apply a corresponding successively increasing phase twist to new channel estimates to remove that frequency bias. After removal of the frequency bias, the channel estimates are filtered with a more narrow band filter centered on zero frequency, such as a moving average filter or filter with exponential forgetting that uses only past history and not future slots. For example, to remove the frequency offset of −100 Hz, which corresponds to a phase shift of$\pi$/8 per 0.625 millisecond slot period, a previous running average channel estimate used in the previous slot is rotated by $\pi$/8 before combining with the new channel estimate to obtain a new running average applicable to the current slot. The rotation may be applied for different rays, according to whether the determined spectral asymmetry was zero, +100 Hz, or −100 Hz.

It is apparent from the above example that obtaining only a 16-point power spectrum using 0.625 millisecond spaced channel estimates cannot specify a smoothing filter in steps of less than 100 Hz in the frequency domain. However, slow moving receivers, such as hand-held receivers, could have considerably more slowly changing rays in which it would be desirable to filter more narrowly. By saving more than sixteen successive channel estimates, a larger FFT, for example, 32-or 64-point, can be performed to give a power spectrum specified in 50 Hz or 25 Hz increments. The same principals as outlined above, however, apply to optimizing the smoothing filter per ray according to the observed fading spectrum for that ray.

Figure 4:
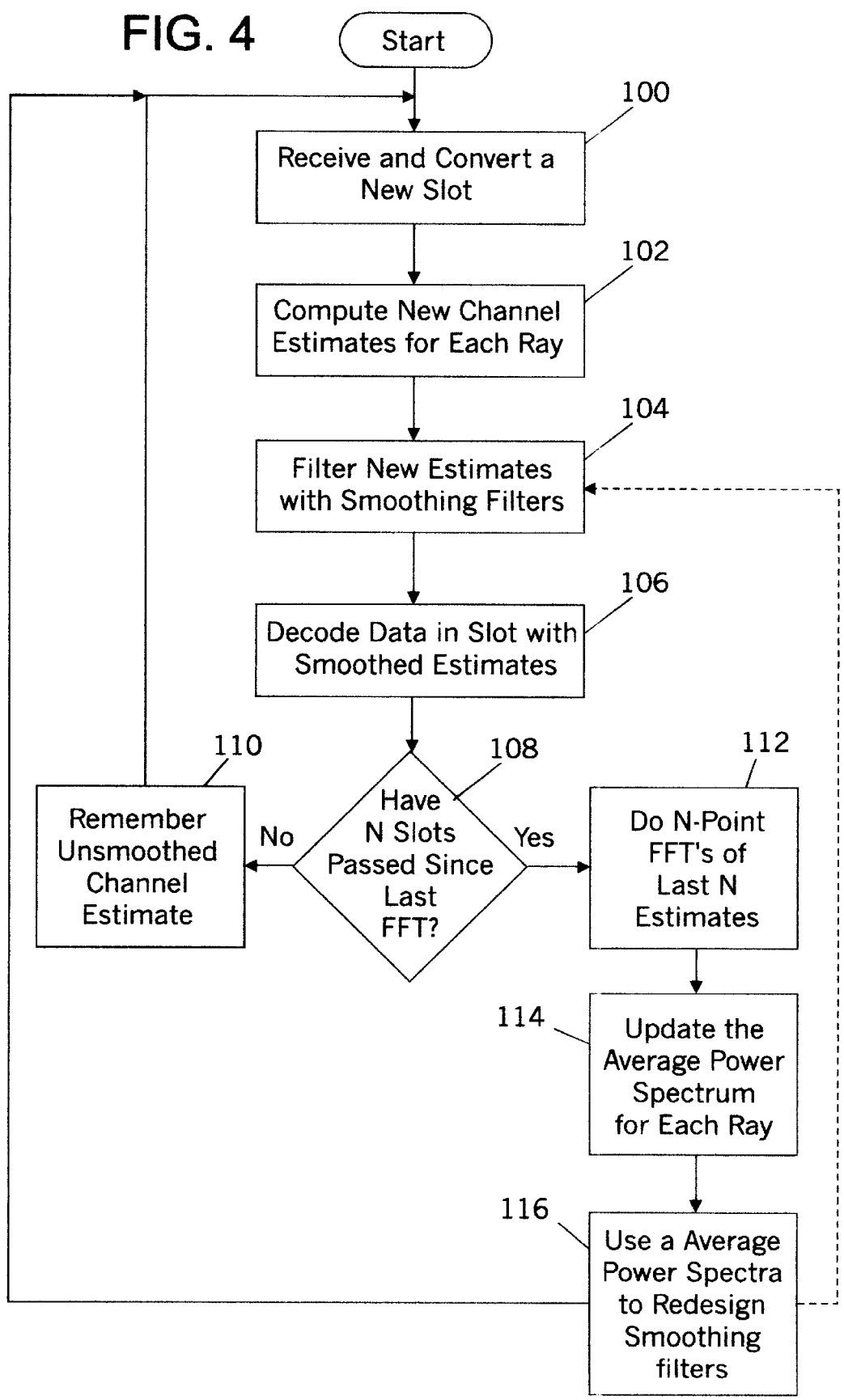
FIG. 4 is a flow chart of the signal processing implemented in the receiving apparatus of FIG. 2.

Referring to FIG. 4, a flow chart illustrates the signal processing implemented in the receiving apparatus 30 of FIG. 2.

The processing begins from a start node and proceeds to a block 100 where the radio receiver and converter 34 of FIG. 2 receives a new 0.625 millisecond slot of a signal. The received signal is converted to digital samples for processing. A block 102 then correlates the samples with known codes to produce channel estimates for all delayed rays of significance. A block 104 filters the new channel estimates for each ray using a smoothing filter adapted to the fading characteristics of that ray. The filtered channel estimates are then used at a block 106 to decode data using, for example, a CDMA rake receiver algorithm.

A decision block 108 determines if N slots have passed since a smoothing filter was last updated by implementing an FFT. If the number of slots is less than N, then the unsmoothed channel estimates are remembered at a block 110 and control returns to the block 100 to receive and convert the next slot. The predetermined number N may be, for example, a number such as 16, 32 or 64. If the number of saved estimates is equal to the predetermined number N, then the last N unsmoothed channel estimates are processed at a block 112 using an FFT, for example, to determine the spectral characteristics of the fading over the last N channel estimates. A block 114 updates the average power spectrum for each ray and the new average spectrum is used at a block 116 to readapt a smoothing filter to the updated average spectrum. The updated coefficients determined at the block to 116 are passed to the block 104, as illustrated in dashed lines, for use in filtering the next channel estimate.

Particularly, the flow chart of FIG. 4 illustrates how smoothing filters are constructed. N slots of estimates are collected. After N slots are collected, then an FFT is used to convert a time sequence to the frequency spectrum. The power spectrum is averaged for each ray. With an asymmetrical frequency response, the power spectrum is not centered at zero. If a filter can be centered on an offset spectrum, then a narrower filter can be used. This filters more noise. Thus, by determining a fading spectrum in its entirety, the system can decide characteristics of a smoothing filter. A pass-band filter can be constructed that is the same shape as the signal being smoothed. This allows every spectral component of significance to be passed.

As an example, if significant energy is found between 75 Hz and 125 Hz, then a filter centered at zero must have a bandwidth of 250, i.e., from −125 to +125. By using an asymmetrical filter centered at +100, then the resulting filter utilizes a bandwidth of 50, which is one-fifth the bandwidth of the zero centered filter.

In order to smooth out the processing load, it can be desirable to stagger the N-slot periods for each ray for performing a new spectral estimate for the ray. For example, ray 1 can have its spectral estimate computed from slots 1–16; ray 2 from slots 2–17, ray 3 from slots 3–18, etc. until ray 1 uses slots 17–32 the next time. That way, not all FFTs for all rays have to be performed at once. Instead, one FFT for one ray is performed at each slot, and that ray's filter is updated. Thus, at any point in time, some of the ray smoothing filters have been updated more recently than others, and the receiver does not have to perform a sudden burst of processing all at once.

Those skilled in the art will recognize that Fourier transforms are not the only way to estimate the spectral characteristics of a complex numerical sequence. Another implementation is possible using complex autocorrelation of the sequence of channel estimates. Using the complex autocorrelation values, a prediction filter can be constructed by known means, except that the prediction coefficients for this invention will be complex due to the expected frequency asymmetry, and not real coefficients as in the prior art.

Many ways of exploiting the asymmetrical fading spectrum expected in wide band CDMA systems have been disclosed above, resulting in an effective reduction of the apparent fading rates and, therefore, an improvement in receiver performance. This improvement translates directly to an increase in system capacity and, therefore, to economically more competitive mobile communication systems.

As will be appreciated by one of ordinary skill in the art, the present invention may be embodied as methods or devices. Accordingly, the present invention may take the form of an entirely hardware embodiment, an entirely software embodiment, or an embodiment combining hardware and software aspects. The present invention has been described in part with respect to the block diagram of FIG. 2 and the flow chart of FIG. 4. It will be understood that each block of the block diagram or flow chart illustration, and combinations of blocks in either, can be implemented by computer program instructions. These program instructions, which represent steps, may be provided to a processor to produce a machine.

Accordingly, blocks of the block diagram and the flow chart illustration support combinations of means for performing the specified functions and combinations of steps for performing the specified functions. It will be understood that each block and combinations of blocks can be implemented by special purpose hardware-based systems which perform the specified functions or steps, or combinations of special purpose hardware and computer instructions.

I claim:

1. A receiver for decoding signals received via multiple propagation paths having different propagation delays, comprising:

receive means for receiving the signals and converting the signals to digital samples for processing;

first processing means operatively associated with the receive means for correlating periodically selected groups of the digital samples corresponding to known symbols and periodically producing numerical estimates related to amplitudes and phases of the delayed propagation paths;

filter means for filtering said numerical estimates using filters periodically adapted to center frequencies of variations of said numerical estimates; and second processing means operatively associated with the receive means and the filter means for decoding data using said filtered estimates and said digital data.

2. The receiver of claim 1 wherein said receive means is adapted to receive Code Division Multiple Access signals.

3. The receiver of claim 1 wherein said first processing means comprises a matched filter matched to said known symbols.

4. The receiver of claim 1 wherein said known symbols comprise pilot symbols spread with a known CDMA spreading code.

5. The receiver of claim 4 wherein said pilot symbols recur in said signals every 0.625 milliseconds.

6. The receiver of claim 1 wherein said filter means comprises a Finite Impulse Response (FIR) filter.

7. The receiver of claim 6 wherein said FIR filter processes a stream of real estimate values and a stream of corresponding imaginary estimate values jointly using a set of complex coefficients.

8. The receiver of claim 6 wherein said FIR filter comprises a minimum phase filter.

9. The receiver of claim 1 wherein said filter means comprises a running average filter.

10. The receiver of claim 9 wherein said running average filter is compensated for frequency offset in filtered values.

11. The receiver of claim 1 wherein said filter means has an asymmetrical frequency response.

12. The receiver of claim 1 wherein said second processing means comprises a rake receiver.

13. The receiver of claim 1 further comprising third processing means operatively associated with the first processing means for estimating said center frequencies using said periodically produced numerical estimates and updating the filter means with said estimated center frequencies.

14. The receiver of claim 13 wherein said third processing means computes a complex autocorrelation.

15. The receiver of claim 13 wherein said third processing means computes a complex Fourier Transform.

16. A receiving apparatus comprising:

a receiver receiving signals via multiple propagation paths having different propagation delays and converting the signals to digital samples for processing;

a channel estimator operatively coupled to the receiver for correlating periodically selected groups of the digital samples corresponding to known symbols and periodically producing numerical estimates related to amplitudes and phases of the delayed propagation paths;

a filter system for filtering said numerical estimates using filters periodically adapted to center frequencies of variations of said numerical estimates; and a data decoder operatively coupled to the receiver and the filter system for decoding data using said filtered estimates and said digital data.

17. The receiving apparatus of claim 16 wherein said receiver is adapted to receive Code Division Multiple Access signals.

18. The receiving apparatus of claim 16 wherein said channel estimator comprises a matched filter matched to said known symbols.

19. The receiving apparatus of claim 16 wherein said known symbols comprise pilot symbols spread with a known CDMA spreading code.

20. The receiving apparatus of claim 19 wherein said pilot symbols recur in said signals every 0.625 milliseconds.

21. The receiving apparatus of claim 16 wherein said filter system comprises a Finite Impulse Response (FIR) filter.

22. The receiving apparatus of claim 21 wherein said FIR filter processes a stream of real estimate values and a stream of corresponding imaginary estimate values jointly using a set of complex coefficients.

23. The receiving apparatus of claim 21 wherein said FIR filter comprises a minimum phase filter.

24. The receiving apparatus of claim 16 wherein said filter system comprises a running average filter.

25. The receiving apparatus of claim 24 wherein said running average filter is compensated for frequency offset in filtered values.

26. The receiving apparatus of claim 16 wherein said filter system has an asymmetrical frequency response.

27. The receiving apparatus of claim 16 wherein said decoder comprises a rake receiver.

28. The receiving apparatus of claim 16 further comprising a filter synthesizer operatively associated with the channel estimator for estimating said center frequencies using said periodically produced numerical estimates and updating the filter system with said estimated center frequencies.

29. The receiving apparatus of claim 28 wherein said filter synthesizer computes a complex autocorrelation.

30. The receiving apparatus of claim 28 wherein said filter synthesizer computes a complex Fourier Transform.

31. The method of decoding signals received via multiple propagation paths having different propagation delays, comprising the steps of:
   receiving the signals and converting the signals to digital samples for processing;
   correlating periodically selected groups of the digital samples corresponding to known symbols and periodically producing numerical estimates related to amplitudes and phases of the delayed propagation paths;
   filtering said numerical estimates using filters periodically adapted to center frequencies of variations of said numerical estimates; and
   decoding data using said filtered estimates and said digital data.

32. The method of claim 31 wherein said receiving step receives Code Division Multiple Access signals.

33. The method of claim 31 wherein said correlating step utilizes a matched filter matched to said known symbols.

34. The method of claim 31 wherein said known symbols comprise pilot symbols spread with a known CDMA spreading code.

35. The method of claim 34 wherein said pilot symbols recur in said signals every 0.625 milliseconds.

36. The method of claim 31 wherein said filter step utilizes a Finite Impulse Response (FIR) filter.

37. The method of claim 36 wherein said FIR filter processes a stream of real estimate values and a stream of corresponding imaginary estimate values jointly using a set of complex coefficients.

38. The method of claim 36 wherein said FIR filter comprises a minimum phase filter.

39. The method of claim 31 wherein said filtering step utilizes a running average filter.

40. The method of claim 39 wherein said running average filter is compensated for frequency offset in filtered values.

41. The method of claim 31 wherein said filtering step has an asymmetrical frequency response.

42. The method of claim 31 wherein said decoding step a rake receiver to decode said data.

43. The method of claim 31 further comprising the step of estimating said center frequencies using said periodically produced numerical estimates and updating the filter means with said estimated center frequencies.

44. The method of claim 43 wherein said estimating step computes a complex autocorrelation.

45. The method of claim 43 wherein said estimating step computes a complex Fourier Transform.

46. A receiver for decoding signals received via multiple propagation paths having different propagation delays, comprising:
   a channel estimator for periodically estimating phase and amplitude of signals received through each propagation path and producing a corresponding complex channel estimate;
   a selector for selecting the propagation paths of significant amplitude;
   for each selected propagation path, a filter for smoothing the associated sequence of successive complex channel estimates using a set of filtering parameters adapted to the respective propagation path to produce smoothed estimates for each path; and
   an adaptor periodically to readapt said sets of filtering parameters to the respective propagation paths at determined staggered intervals whereby a subset of said sets of filtering parameters is readapted at each staggered interval and other subsets are readapted at other, intervening staggered intervals.

47. The receiver of claim 46 wherein said subsets each comprise only one set of filtering parameters.

* * * * *

UNITED STATES PATENT AND TRADEMARK OFFICE
CERTIFICATE OF CORRECTION

PATENT NO.    : 6,507,602 B1                                              Page 1 of 1
DATED         : January 14, 2003
INVENTOR(S)   : Dent, Paul W.

It is certified that error appears in the above-identified patent and that said Letters Patent is hereby corrected as shown below:

Column 14,
Line 17, after "step" insert -- utilizes --; and
Line 43, please delete "periodically to" and insert -- to periodically --.

Signed and Sealed this

Tenth Day of June, 2003

JAMES E. ROGAN
*Director of the United States Patent and Trademark Office*